Feb. 6, 1934.  C. H. KING  1,945,694
BATTERY
Filed Aug. 17, 1931
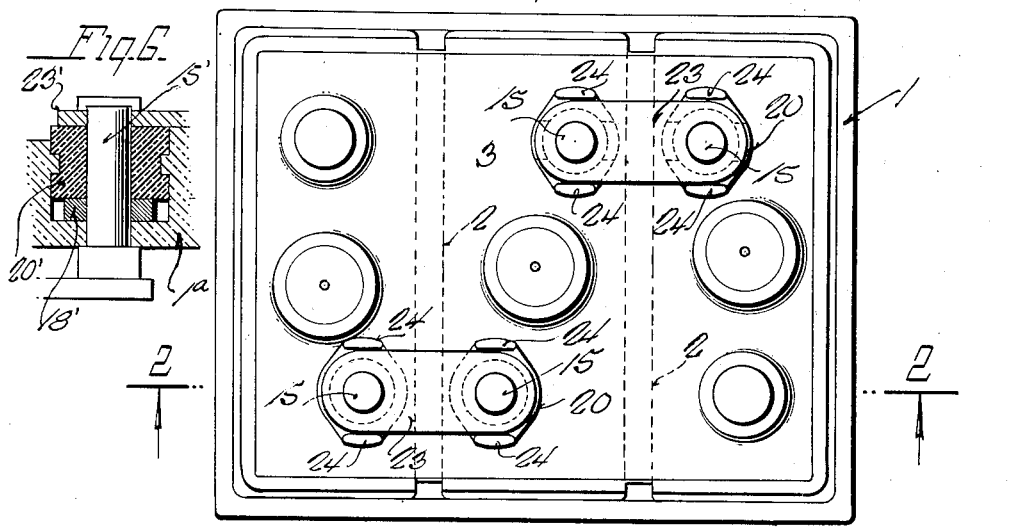
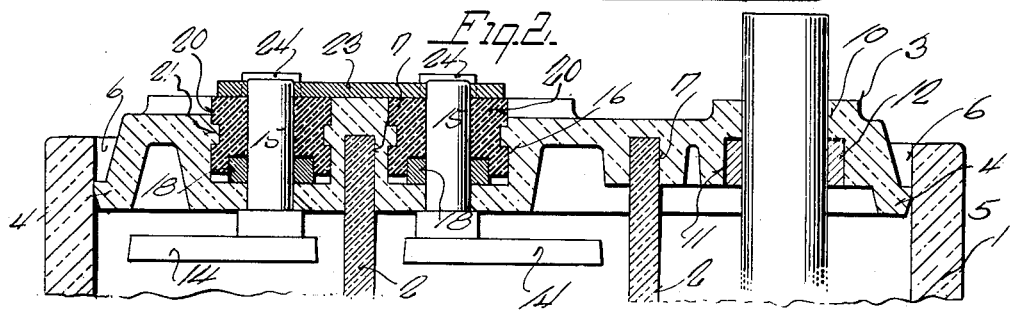
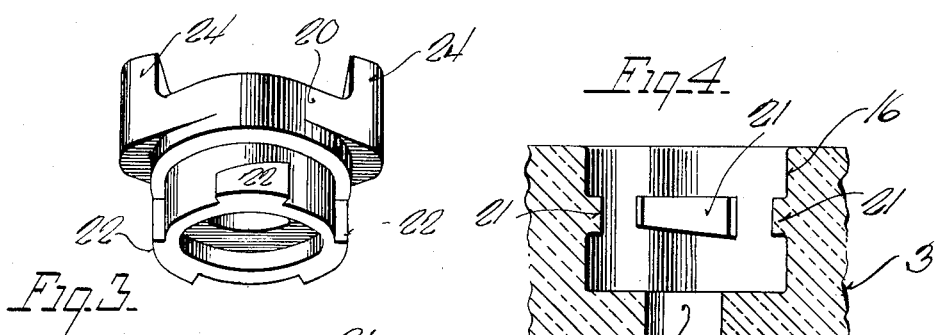
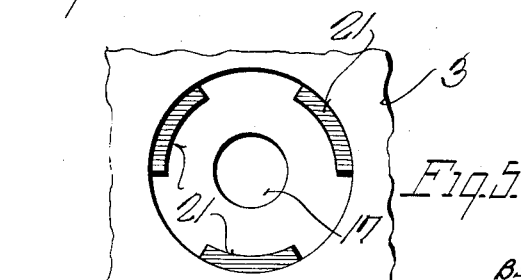
INVENTOR.
Carl H. King.
BY
ATTORNEYS Patented Feb. 6, 1934

1,945,694

UNITED STATES PATENT OFFICE 1,945,694

BATTERY

Carl H. King, Milwaukee, Wis., assignor to Globe-Union Mfg. Co., Milwaukee, Wis., a corporation of Wisconsin Application August 17, 1931. Serial No. 557,544

2 Claims. (Cl. 136—168)

This invention relates in general to batteries, and more particularly to the cover employed for batteries, to the manner of organizing the cover with partitions of the casing, to the sealing arrangements between the cover and the casing and the cover and the battery posts, and to the novel interconnection of the cell connectors with the posts of each plate group.

With the present invention, a one-piece premolded cover is employed notwithstanding that external cell connectors are used. The one-piece molded cover has channels receiving the partitions between the cell or compartments of the battery case and has a reduced marginal flange which sets down into the upper end of the battery casing and coacts with the channels and partitions in holding the cover against shifting. Sealing rings in the form of bushings or gasket rings are provided for the battery posts. The bushings or gasket rings for the posts to which the cell connectors are joined are compressed into sealing engagement with the cover and posts by sleeves or glands interconnected with the cover by threads or bayonet joints and exerting a sealing pressure on the sealing rings whether the latter are in the form of gasket rings or bushings. The sleeves or glands are locked in assembled position by interfitting the cell connectors therewith.

The use of one-piece cover batteries has been recognized as desirable, but their use has been very limited, due to the increase in production costs over the costs of individual cell covers. The increase in cost of the prior covers occurs because of the difficulties which are encountered in making the proper seal around the battery posts, and this is especially true in connection with posts to which the cell connectors are attached.

Further disadvantages with the prior covers arise because of complications in the molding of the cover itself due to the necessity of having special pockets, recesses or depressions in the cover and to the necessity of imbedding metallic elements therein to interconnect or accommodate the cell connectors either below the cover or over the battery container partitions.

The present method of making the one-piece cover and the structure of the one-piece cover is such as to result in a saving of production costs as compared to a battery with individual cell covers.

These advantages are realized because of the elimination of molding complications and imbedded inserts, and further, the cover need not be of hard rubber, but may be made of a composition material similar to that which constitutes the container of the battery. Such composition material is lower in price than hard rubber. It was not suitable or practical for individual cell covers, because of the thin sections required in the individual cell covers, and for this reason has not been used commercially for individual cell covers.

Sealing compound need not be employed between the cover and partitions as a close fit between channels of the cover and the partitions provides for the electric insulation of the adjacent cells. Another feature of the present invention resides in that fact that the cover is self-alining when interfitted with the casing and interengaged with the partitions thereof. In other words, the necessity of alining a separate or individual cover for each cell is eliminated.

In general, the present invention has the advantage of lowering the cost of the cover, effecting reliable sealing between the cover and the posts in a simple and easy manner, providing a battery with a top which may be easily cleaned, improving the appearance of the battery and eliminating the use of sealing compounds between the cover and partitions and avoiding the necessity of separately lining up individual covers.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view in top plan showing a battery equipped with a cover embodying the present invention;

Figure 2 is a view in section taken on line 2—2 of Figure 1;

Figure 3 is a detail perspective view of one of the glands or locking sleeves employed between the battery post and the cell connectors;

Figure 4 is a detail sectional view through one of the openings in the cover through which a battery post adapted to be connected to a cell connector extends;

Figure 5 is a view in top plan of the structure shown in Figure 4; and

Figure 6 is a fragmentary view partly in section and partly in elevation and showing a modification.

Referring to the drawing, the numeral 1 designates a battery case or container having partitions 2 which divide up the interior of the casing into cell compartments. The cover is designated generally at 3 and has a marginal flange designated at 4 which coacts with the upper end portion of the container to provide a groove 6 for receiving a sealing compound. Intermediate portions of the underside of the cover are formed with downwardly opening grooves or channels 7 in which the upper ends of the partitions 2 are a snug fit. The fit between the upper ends of the partitions 2 and the channels 7 is such as to effectively electrically insulate the compartments of the battery from each other. This interfitting of the cover and partitions aids in properly alining the cover and in holding the same against displacement in the assembly whereby strains on the posts are avoided. The terminal posts of the battery project through openings 10, the lower portions of which are enlarged as at 11 to receive a sealing bushing 12.

For interconnecting the cells of the battery each plate group has the connecting straps 14 of its plates provided with a battery post 15 which projects upwardly through an opening in the cover designated generally at 16. Each opening 16 has a reduced portion 17 adjacent its lower end to accommodate the post 15. A sealing ring 18 which may be in the form of a bushing as shown in Figure 2 is fitted over the post 15 above the reduced portion 17 of the opening and is compressed into sealing engagement with the post and with the cover by means of a sleeve or gland designated generally at 20. The sleeve 20 is rotatably fitted on the post 15 and is interconnected with the cover in such manner that when it is turned it will be forced downwardly to compress the sealing ring. The interconnection between the sleeve 20 and the cover may be effected in a variety of ways. For example, the sleeve 20 may be threadedly interconnected with the cover. Preferably, however, a bayonet type of lock is provided between the sleeve 20 and cover and consists of spaced lugs 21 integrally formed with the cover and projecting in from the wall of each opening 16 and corresponding lugs 22 integrally formed with the sleeve 20 and projecting outwardly therefrom. The spacing of the lugs 21 and 22 is such that the sleeve or gland may be positioned to permit the lugs 22 to pass down in between the lugs 21. After the lugs 22 are below the lugs 21 and the sleeve 20 is rotated, the lugs 22 have their upper inclined surfaces engaged with the lower inclined surfaces of the lugs 21 so that the sleeve 20 is forced downwardly due to the coaction of the lugs. The upper ends of the sleeve 20 terminate below the tops of the posts 15 to permit the apertured ends of the cell connectors designated at 23 to be fitted over the upper ends of the posts and fused thereto by lead burning, or the like. In order to hold the sleeves 20 in locked position they are provided with upstanding ears 24 which engage the sides of the end portions of the cell connectors in the assembly.

With the present invention the construction is so simplified and so well adapted to standard manufacturing methods and the elements of the battery are so closely and compactly organized and of such novel structure that the cost of the cover is lower. Further, effective and reliable sealing is provided between the cover and the battery posts and this sealing is had in an easy and simple manner. The top of the battery may be easily cleaned. The appearance of the battery is enhanced. Finally, the several cover elements necessary with the prior individual cell covers are reduced in number in that only one cover element is utilized and at the same time the cover is self-alining and the construction permits of assembly of the battery with the plates wet.

In the construction illustrated in Figure 6, a fragment of the cover is designated generally at 1ª, a battery post at 15′ and a connector at 23′. In this modified type of construction the only variation consists in having the sealing ring in the form of a gasket ring designated at 18′. The sleeve or gland designated at 20′ is constructed substantially like the sleeve or gland 20 shown in Figures 2, 3 and 4, except that its lower end is not recessed.

The invention claimed is:

1. A battery including a cover provided with openings through which the posts of the battery project, sealing rings fitted on the posts within said openings, sleeves fitting around the posts and engageable with the sealing rings, a bayonet lock between each sleeve and the cover, and cell connectors between certain of said posts and engageable with the sleeves for holding them in operative position.

2. A battery having the usual battery posts, a cover for the battery having openings through which the posts project, sealing rings fitted on the posts and engaging the cover, sleeves interconnected with the cover and engaging the sealing rings for compressing them into sealing engagement with the cover and posts, and cell connectors extending between certain of said posts, said sleeves having spaced ears engageable with the cell connectors whereby the cell connectors secure the sleeves in proper position in the assembly.

CARL H. KING.